(12) United States Patent
Ruch et al.

(10) Patent No.: US 9,356,547 B2
(45) Date of Patent: May 31, 2016

(54) METHOD AND DEVICE FOR OPERATING AN OPERATING TABLE

(71) Applicant: Maquet GmbH, Rastatt (DE)

(72) Inventors: Jurgen Ruch, Offenburg (DE); Michael Welsch, Gaggenau (DE)

(73) Assignee: Maquet GMBH, Rastatt (DE)

( * ) Notice: Subject to any disclaimer, the term of this patent is extended or adjusted under 35 U.S.C. 154(b) by 174 days.

(21) Appl. No.: 14/250,884

(22) Filed: Apr. 11, 2014

(65) Prior Publication Data
US 2014/0304917 A1 Oct. 16, 2014

(30) Foreign Application Priority Data

Apr. 15, 2013 (DE) .................. 10 2013 103 755

(51) Int. Cl.
*A61G 13/08* (2006.01)
*H02P 8/00* (2006.01)
*A61G 7/018* (2006.01)
*A61G 13/02* (2006.01)
*A61G 13/04* (2006.01)
*A61G 13/06* (2006.01)

(52) U.S. Cl.
CPC *H02P 8/00* (2013.01); *A61G 7/018* (2013.01); *A61G 13/02* (2013.01); *A61G 13/04* (2013.01); *A61G 13/06* (2013.01); *A61G 13/08* (2013.01); *A61G 2203/12* (2013.01)

(58) Field of Classification Search
CPC ....................................... A61G 13/08
USPC ....................... 5/613, 616, 601, 600
See application file for complete search history.

(56) References Cited

U.S. PATENT DOCUMENTS

| | | | |
|---|---|---|---|
| 5,926,002 A | 7/1999 | Cavanaugh et al. | |
| 7,669,261 B2 | 3/2010 | Frueh et al. | |
| 7,810,185 B2 | 10/2010 | Buerstner | |
| 8,249,457 B2 | 8/2012 | Ruch et al. | |
| 2003/0115672 A1 | 6/2003 | Newkirk | |
| 2007/0101500 A1* | 5/2007 | Fruh ...................... | A61G 13/02 5/613 |
| 2008/0114614 A1 | 5/2008 | Mahesh | |
| 2013/0003938 A1 | 1/2013 | Watanabe et al. | |

FOREIGN PATENT DOCUMENTS

| | | |
|---|---|---|
| DE | 199 55 116 A1 | 5/2001 |
| DE | 10 2005 053 754 A1 | 5/2007 |
| DE | 10 2005 054 223 A1 | 5/2007 |
| DE | 10 2005 054 230 A1 | 5/2007 |
| DE | 10 2007 062 200 A1 | 9/2008 |
| EP | 1419757 A2 | 5/2004 |
| JP | 01-233504 | 9/1989 |
| JP | 2000-115618 | 4/2000 |
| JP | 2002-248137 A | 9/2002 |
| JP | 2005-221623 | 8/2005 |
| WO | 2006/038161 A1 | 4/2006 |
| WO | WO 2006/038161 A1 | 4/2006 |

* cited by examiner

*Primary Examiner* — Fredrick Conley

(57) ABSTRACT

The invention relates to a method and a device for operating an operating table (30) comprising a plurality of components (32 to 46) which are adjustable by means of control elements. By actuating at least a first control element (14 to 24), a first action of at least a first drive unit for adjusting at least a first component (32 to 46) is performed. By actuating a second control element (26), the first action performed by actuating the first control element (14 to 24) is automatically completely reversed.

20 Claims, 3 Drawing Sheets

METHOD AND DEVICE FOR OPERATING AN OPERATING TABLE

CROSS REFERENCE TO RELATED APPLICATIONS

Applicant hereby claims foreign priority benefits under U.S.C. §119 from German Utility Model Application No. DE 10 2013 103 755.0 filed on Apr. 15, 2013, the contents of which are incorporated by reference herein.

TECHNICAL FIELD

The invention relates to a method and a device for operating an operating table having a plurality of components which are adjustable by means of control elements. During an operation of a patient lying on the operating table, the position of the patient is changed several times in order to facilitate the operation. Here, it is often necessary to place the patient in a position which the patient had already assumed before. Likewise, a repeated change between two or more positions may be necessary during an operation.

BACKGROUND

From the document DE 199 55 116 A1, a control unit for controlling the drives of a patient support surface having electromotively adjustable components is known, which patient support surface is removable from an operating table column, said control unit comprising an energy supply, controlling means and a control panel. The control panel is integrated in a transport carriage for transporting the operating table support surface.

From the document DE 10 2007 062 200 A1, an operating table having a plurality of components which are adjustable by means of control elements is known. The state and/or the change of state of at least some of the control elements are sensed by sensors, the signals generated by the sensors being supplied to a processing device.

From the document DE 10 2005 054 230 A1, a method and a device for the bidirectional infrared data transmission between an operating table and a control panel are known. The operating table and the control panel are both users of an infrared data transmission and each comprises an infrared sender and an infrared receiver.

From the document DE 10 2005 054 223 A1, a device for adjusting an operating table is known, the operating table having an operating table column on which an adjustable patient support surface is removably mounted. The device comprises a control panel for the input of adjusting commands for adjusting components of the operating table. The adjusting commands can be transmitted from the control panel directly to the adjustable support surface.

From the document DE 10 2005 053 754 A1, a device for adjusting the patient support surface of an operating table is known, which comprises several segments that are adjustable relative to each other. At least some of the adjustable segments are connected to actuators which are controllable for adjusting the associated segments. The input device has means for inputting body part-related adjusting commands which are associated with the adjustment of the position of a body part or body section of a patient lying on the patient support surface.

However, for some operations it is desirable to restore a patient's position by a corresponding adjustment of the components of an operating table, which position had already been assumed by the patient before, in particular when this position had been established relatively elaborately by means of one or more control elements.

SUMMARY

It is the object of the invention to specify a method and a device for operating an operating table, by which it is easily possible to restore a position of the adjustable components of the operating table in an easy manner, after this position had been changed by means of control elements.

This object is solved by a method for operating an operating table comprising a plurality of components which are adjustable by means of control elements, wherein by actuating at least a first control element, a first action of at least a first drive unit for adjusting at least a first component is performed, and that by actuating a second control element, the first action performed by actuating the first control element is automatically completely reversed. Advantageous developments of the invention are specified in the dependent claims.

In the inventive method for operating an operating table, a first action of at least a first drive unit for adjusting at least a first component is performed by actuating at least a first control element. Further, by actuating a second control element, the first action performed by actuating the first control element is automatically completely reversed. As a result thereof, a position of the adjustable components of the operating table that was set prior to the performed action can be restored easily just by actuating the second control element without the position of the components having to be reset in an elaborate manner by the surgeon or an assistant. In this way, an easy and safe operation of the operating table is guaranteed. By automatically reversing the movement of the components performed during the first action, movements of these components which are unfavorable for patients lying on the support surface are avoided as well.

It is particularly advantageous when the first action is automatically completely reversed by a second action, during which the first drive unit and/or the first component automatically completely perform a reverse sequence of movements as compared to when performing the first action. By the reverse sequence of movements, it is in particular guaranteed that the movement of the components and the movement of the patient caused thereby correspond to an exactly reverse movement of the patient during the first action so that no movement is to be expected that would endanger the patient.

Further, it is advantageous that, when a third control element is actuated, at least a third action of at least a second drive unit for adjusting the first component and/or at least a second component is performed and when by actuating the second control element the first action and the third action are automatically completely reversed. As a result thereof, a change of position of the patient caused by actuating the first and the third control element can automatically completely be reversed just by actuating the second control element so that also several performed actions can automatically completely be reversed in an easy manner, as a result whereof a position of the components of the operating table already set before as well as a position of the patient caused thereby can be restored in an easy manner.

Here, the first action and the third action can be performed one after the other, the third action being performed after the first action. When actuating the second control element once, the third action is automatically completely reversed, preferably by a fourth action. When actuating the second control element once again, the first action is automatically completely reversed, preferably by the second action. As a result thereof, several successively performed actions can automatically be reversed step-by-step by a repeated activation of the second control element, as a result whereof the movement of the patient caused by the first and the third action is performed in the reverse direction so that it can be assumed that no movements of the components of the operating table are performed that are unsuitable for the patient.

Alternatively or additionally, the third control element can be actuated while the first action is performed, as a result whereof at least a part of the third action is performed during, i.e. simultaneously to the first action. When the second control element is actuated, the first and the third action are performed in reverse sequence of movements so that the first and the third action are reversed, at least in part simultaneously, preferably by a second and a fourth action. In this way, a position already set before can be restored automatically in a manner that is gentle for the patient, after said position had been changed by several operating actions.

It is particularly advantageous when, by actuating a fourth control element, the action that has automatically completely been reversed before is repeatedly performed or when, by actuating the fourth control element, the actions that have automatically completely been reversed before are repeatedly completely performed. In this way, an action that has been reversed can automatically be performed again so that it is in particular very easy to switch between two different positions. Further, it is thus achieved that when an action is reversed inadvertently, said action can easily be performed again. The automatic complete reversion of an action is also referred to as UNDO and the repeated performance of a reversed action is referred to as REDO.

Further, it is advantageous that, when an action is reversed, the drive unit controlled for performing the action is automatically controlled such that a complete reverse sequence of movements of the movement of the component performed during the action is performed. As a result thereof, a safe movement of the patient is guaranteed as only a reverse sequence of movements of an already performed movement is caused and not a sequence of movements differing therefrom that might endanger the patient and might not be foreseeable by the surgeon.

Further, it is advantageous that, when each action is performed, the time course of the change and/or the time course of the speed of change of the angular position of a driven shaft of the drive unit or of the driven shafts of several drive units, the time course of the change and/or of the speed of change of the angular position of the driven component or the driven components is detected and stored as information, wherein, when an action is automatically completely reversed, then the drive unit or the drive units are driven based on the stored information such that it itself automatically performs a complete reverse sequence of movements as compared to the action to be reversed. Thus, it is achieved that by the detected information the same sequence of movements is actually performed in the reverse sequence of movements so that an undesired movement of the patient is avoided.

Further, when each action is performed, the sequence of steps and/or the time course of the sequence of steps of a stepper motor serving as a drive unit can be detected and stored as information. When the action is automatically completely reversed, the stepper motor is driven in a reversed sequence of steps and/or with opposite direction of rotation based on the stored information. In this way, a reverse movement of a component can be achieved in an easy manner, which movement has been performed before during the action to be reversed.

Alternatively or additionally, when each action is performed, an adjusting action, the adjusting travel, the time course of the adjusting travel, the adjusting speed and/or the time course of the adjusting speed of a linear drive serving as a drive unit can be detected and stored as information. When the action is reversed, the linear drive is driven based on the stored information such that the at least one component performs a reverse sequence of movements as compared to the action to be automatically completely reversed.

Additionally or alternatively, the duration of the activation of the drive unit and/or the speed stage activated for the drive unit can be detected and stored as information. By means of this information, a drive unit can be driven in an easy manner such that a reverse sequence of movements can easily be achieved.

It is particularly advantageous when the at least one drive unit and/or the plurality of drive units are driven by a control unit dependent on the operating inputs made by actuating the control elements. In this way, an easy control of the drive units is possible so that a reverse sequence of movements can easily be carried out when an action caused by control elements is activated by actuating a further control element for reversing the action.

It is particularly advantageous when the control unit stores parameters of the performed action and/or the performed actions. In this way, the control unit can easily guarantee that a reverse sequence of movements for automatically completely reversing an already performed action is actually guaranteed, as a result whereof it is avoided that the patient is endangered.

It is particularly advantageous when the control elements are made available by means of a remote control, preferably a wireless remote control. Here, the remote control can alternatively or additionally store parameters of the performed action and/or the performed actions in order to be capable of safely controlling an automatic complete reversion of an already performed action by means of this stored information. As a result thereof, existing operating tables, too, can be retrofitted with an inventive function for automatically completely reversing an action.

Further, it is advantageous that several actions are performed when the first control element is actuated and that said several actions are automatically completely reversed in reserve order when the second control element is actuated. In this way, an easy and safe sequence of movements is achieved by which a patient is not endangered.

A second aspect of the invention relates to a device for operating an operating table comprising a plurality of components that are adjustable by means of control elements. The device comprises at least a first control element, upon actuation of which a first action of at least a first drive unit for adjusting at least a first component of the operating table is performed. The device comprises a second control element, upon actuation of which the first action performed by actuating the first control element is automatically completely reversed. As a result thereof, a sequence of movements of the components of the operating table and thus of the change of position of a patient can easily be reversed and be undone again so that a position of the components of the operating table assumed before performing the action to be reversed can easily be restored.

It is particularly advantageous when the device transfers corresponding information on the automatic complete reversion of the action to an operating table control unit. In this way, the function of automatic complete reversion of an action can easily be realized.

The device according to the second aspect of the invention can be developed with the advantageous developments stated above for the method, wherein the features mentioned are achieved in particular when the device is connected to an operating table.

BRIEF DESCRIPTION OF THE DRAWINGS

Further features and advantages of the invention result from the following description which explains the invention in more detail on the basis of embodiments in connection with the attached Figures, in which.

DETAILED DESCRIPTION

Figure 1A:
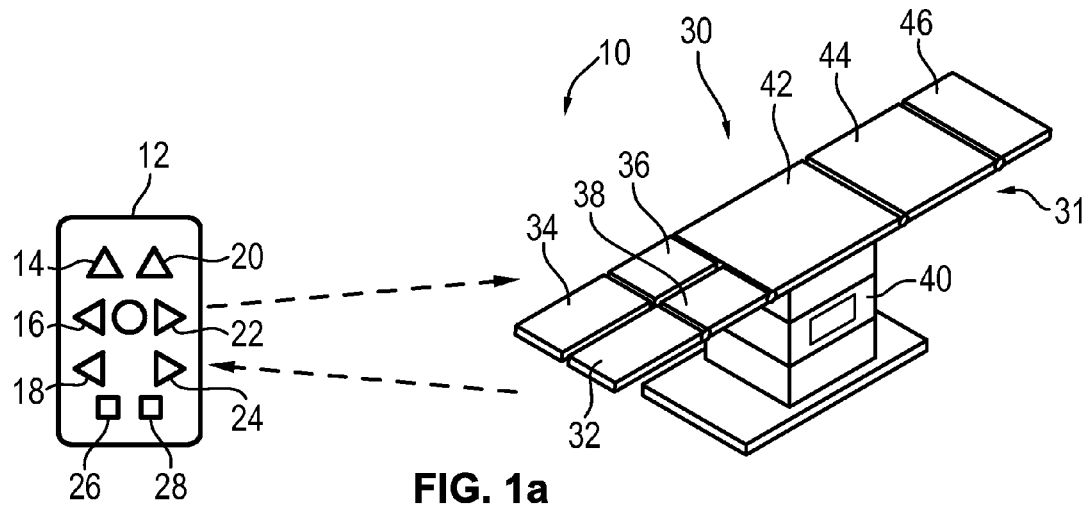
FIG. 1a shows an operating table with several components in a starting position, said components being adjustable by means of control elements made available by a wireless remote control.

FIG. 1a shows an arrangement 10 comprising a remote control 12 having several control elements 14 to 28 by means of which adjustable components 32 to 46 of an operating table 30 can be adjusted, i.e. can be changed in their position in space and/or relative to other components 32 to 46. The individual components 32 to 46 or groups of these components 32 to 46 are assigned to the control elements 14 to 24 of the remote control 12 so that, when a control element 14 to 24 is actuated, a corresponding adjusting action of the component or component group assigned to this control element 14 to 24 is performed.

Figure 1B:
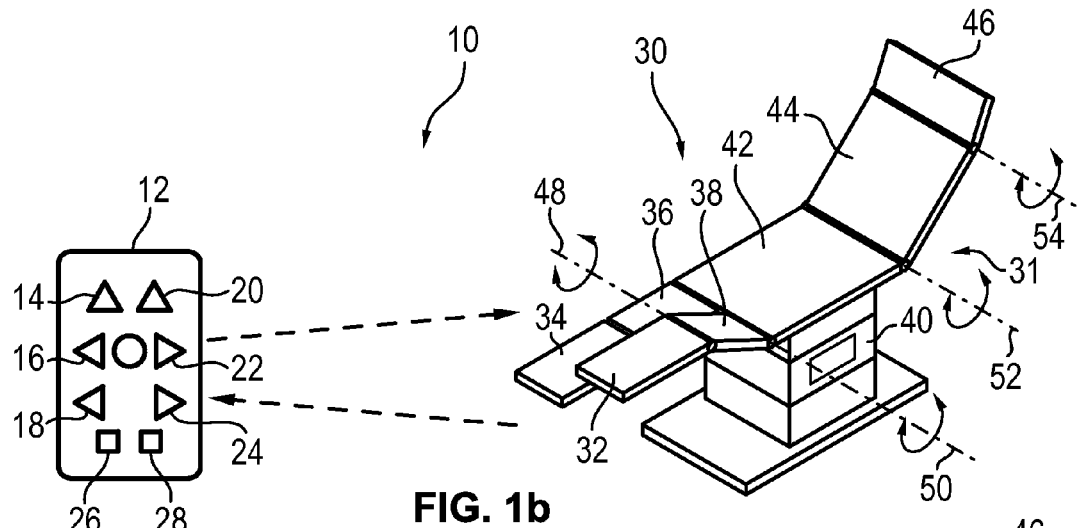
FIG. 1b shows the remote control and the operating table according to FIG. 1a in a first adjusted position.

By corresponding operating inputs via the control elements 14 to 24 of the remote control 12, the patient support surface 31 of the operating table 30 has been adjusted from the starting position shown in FIG. 1a to the first adjusted position shown in FIG. 1b. Here, the components 32 to 48 have been rotated about the axes of rotation 48, 50, 52 and 54 by means of drive units integrated into the patient support surface 31 until the components 32 to 46 of the patient support surface 31 of the operating table 30 have assumed the first adjusted position shown in FIG. 1b. For this, several operating inputs have been made via the control elements 14 to 24 of the remote control 12. In the further course, further operating inputs have been made via the control elements 14 to 24 of the remote control 12 until the components 32 to 46 of the patient support surface 31 of the operating table 30 have assumed the second adjusted position shown in FIG. 1c. For this, the components have again been rotated about the axes of rotation 48 to 54 as well as in addition about the axes of rotation 56 to 58. Further, the height of the operating table column 40 has been reduced so that the height of the patient support surface 31 has decreased from the first adjusted position illustrated in FIG. 1b to the second adjusted position illustrated in FIG. 1c to the height identified with the reference sign 60.

Figure 1C:
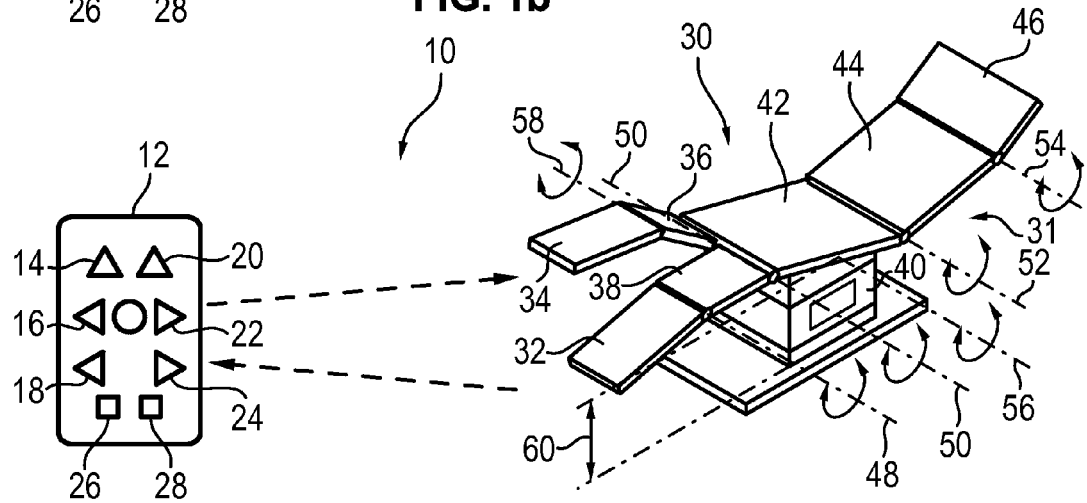
FIG. 1c shows the remote control and the operating table according to FIGS. 1a and 1b in a second adjusted position.
Figure 1D:
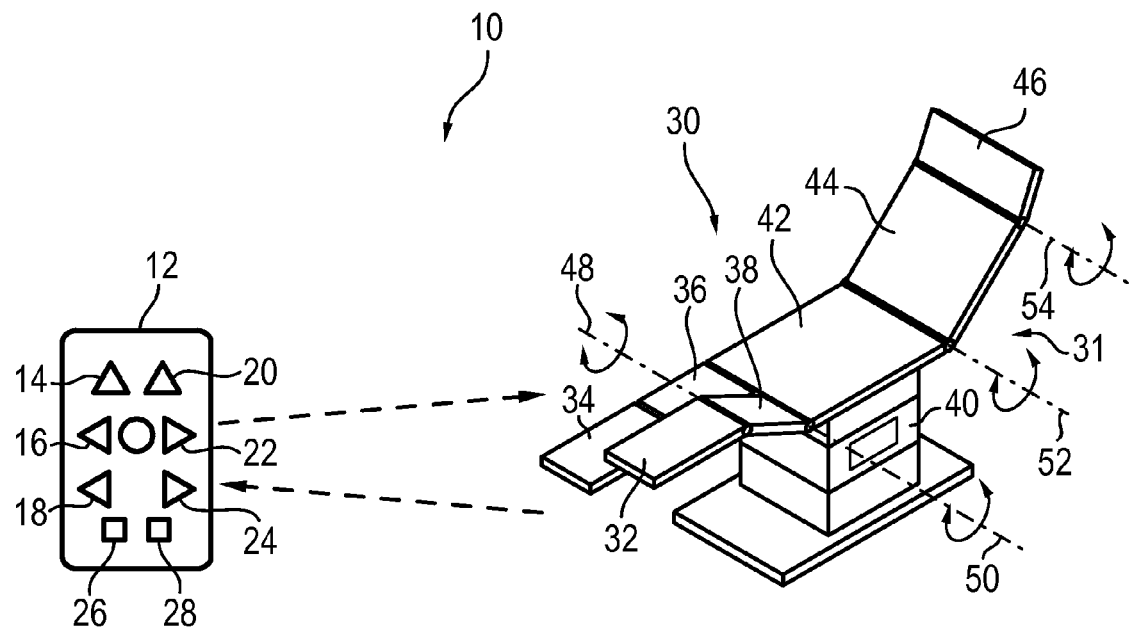
FIG. 1d shows the remote control and the operating table according to FIG. 1a to 1c, after the adjustment of the components carried out between the first adjusted position and the second adjusted position had been reversed.
Figure 1E:
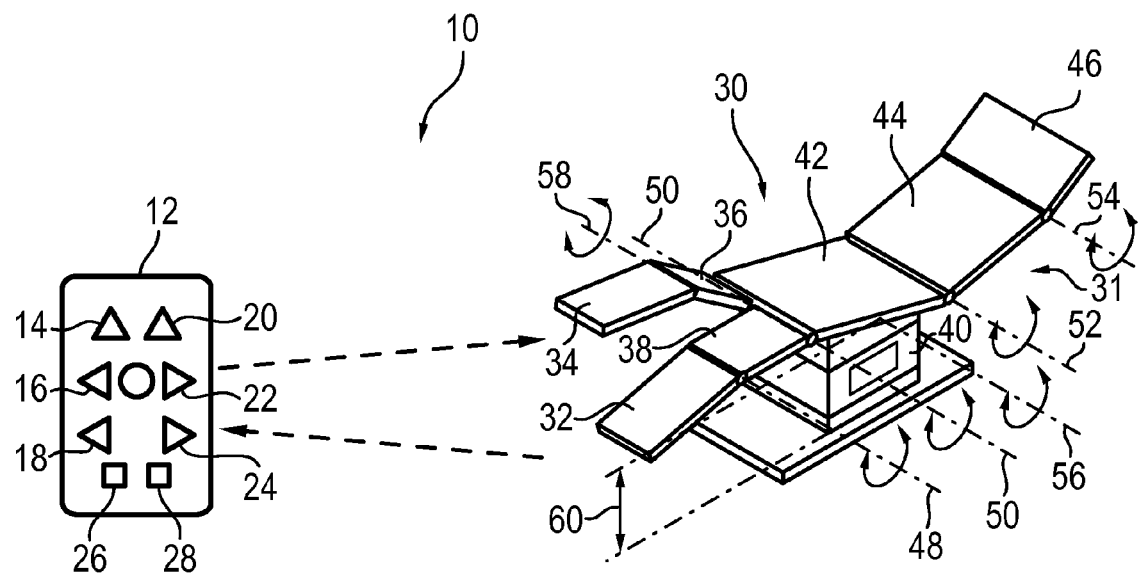
FIG. 1e shows the remote control and the operating table according to FIG. 1a to 1d after the reversed action had been performed repeatedly.

By actuating the UNDO button 26 in the position shown in FIG. 1c, the change of position of the components 32 to 48 from the first adjusted position shown in FIG. 1b into the second adjusted position shown in FIG. 1c is automatically completely reversed so that the components 32 to 46 of the operating table 30 are again in the first adjusted position shown in FIG. 1d. By the subsequent actuation of the REDO button 28, the position of the components 32 to 46 is again changed from the first adjusted position shown in FIG. 1d into the second adjusted position shown in FIG. 1e.

In the described embodiment, several operating actions performed during a period of time are combined in one adjusting action, which operating actions are then automatically all reversed in a reverse sequence of movements when the UNDO button 26 is actuated. In other embodiments of the invention, for each operating input also an information about the action for adjusting the respective component 32 to 48 caused by the operating input can be stored, wherein, then, when the UNDO button 26 is actuated, it is likewise possible to only reverse the last performed action and the previously performed actions are only reversed when the UNDO button 26 is repeatedly actuated. A more detailed subdivision of the operating actions and a corresponding storage of the performed actions have the advantage that various intermediate positions can automatically be restored in an easy manner.

Figure 2:
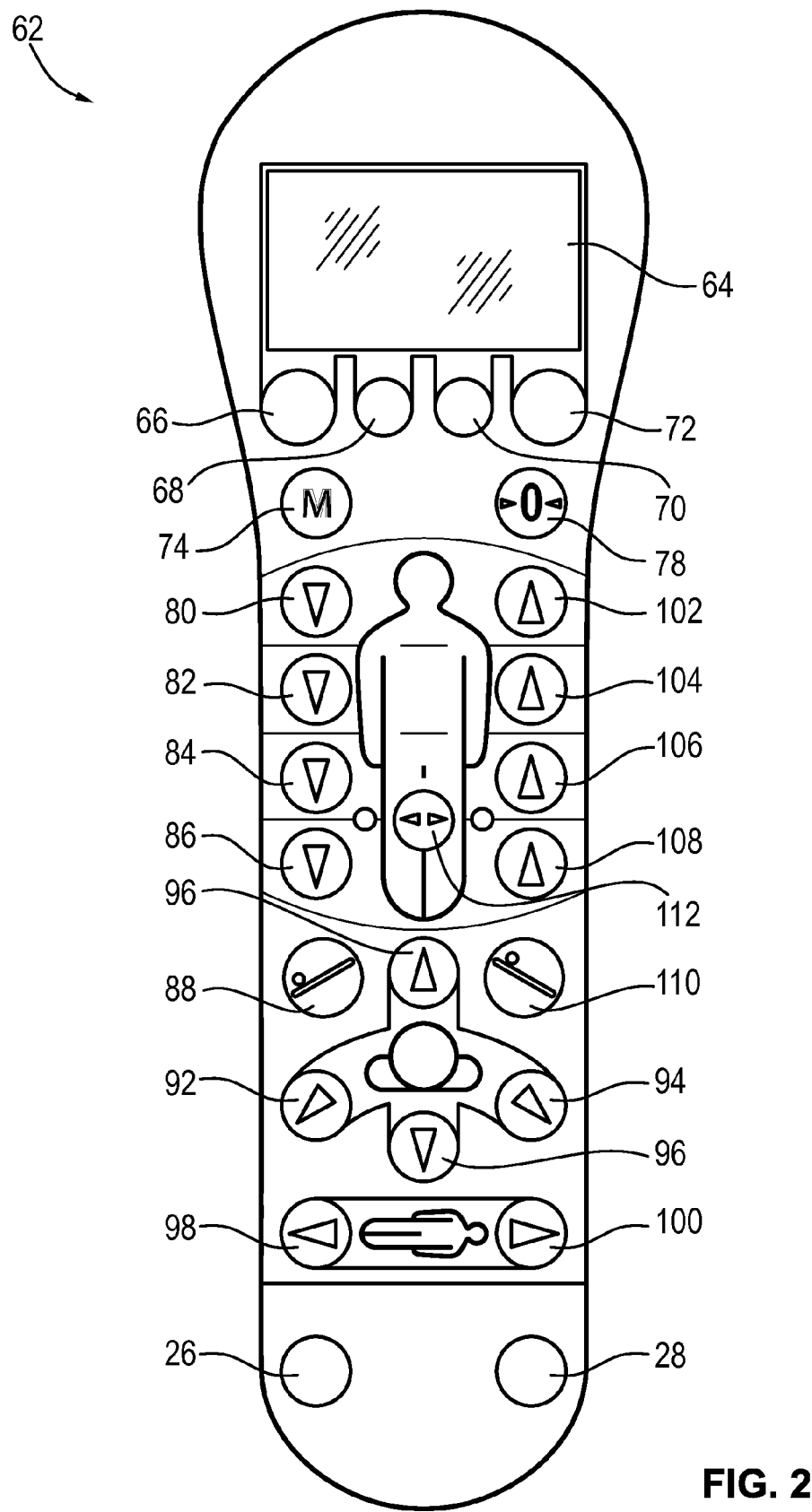
FIG. 2 shows a specific embodiment of a remote control for operating an operating table.

In FIG. 2, a remote control 62 is illustrated which can be used alternatively to the remote control 12. The remote control 62 has a display 64 for displaying information. Further, the remote control 62 has a plurality of control elements 66 to 112, via which various operating inputs for changing the position of the components 32 to 46 of the operating table 30 can be input in a convenient manner. By means of these control elements 66 to 112, the position of individual components 32 to 46 or the simultaneous change of position of several components 32 to 46 can easily be input. In addition, the remote control 62 has an UNDO button 26 and a REDO button 28 which have the same function as previously described in connection with the remote control 12 and FIGS. 1a to 1e.

Although various embodiments of the present invention have been described and shown, the invention is not restricted thereto, but may also be embodied in other ways within the scope of the subject-matter defined in the following claims.

What is claimed is:

1. A method for operating an operating table, comprising:
a plurality of components which are adjustable by control elements, wherein
by actuating a first control element, a first action of a first drive unit that adjusts a first component is performed,
by actuating a second control element, the first action performed by actuating the first control element is automatically completely reversed,
the first action is automatically completely reversed by a second action,
when actuating a third control element, a third action of a second drive unit that adjusts the first component or a second component is performed,
when the second control element is actuated a first time, the third action is automatically completely reversed, and
when the second control element is actuated a second time, the first action is automatically completely reversed.

2. The method according to claim 1, wherein the first action is automatically completely reversed by the second action, during which the first drive unit or the first component automatically completely performs a reverse sequence of movements as compared to performing the first action.

3. The method according to claim 2, wherein when actuating a third control element at least a third action of at least a second drive unit for adjusting the first component or at least a second component is performed and
by actuating the second control element, the first action and the third action are automatically completely reversed.

4. The method according to claim 2, wherein by actuating a fourth control element at least one of the first action, second action, and third action that had automatically completely been reversed before is repeatedly performed.

5. The method according to claim 1, wherein
the first control element is actuated, and as a result the first action is performed,
the third control element is actuated while the first action is performed, and as a result at least a portion of the third action is performed during the first action, and
when the second control element is actuated, the first and the third action are at least partially simultaneously reversed.

6. The method according to claim 1, wherein
by actuating a fourth control element, at least one action that had automatically completely been reversed before is repeatedly performed.

7. The method according to claim 1, wherein when the first action is reversed, the drive unit which is controlled for performing the action is automatically controlled such that a completely reverse sequence of movements of the movement of the component is caused.

8. The method according to claim 1, wherein when each of the first, second, and third actions is performed, the time course of the change or of the speed of change of the angular position of a driven shaft of the drive unit, or of the driven component is detected and stored as information, wherein, when each of the first, second, and third actions is automatically completely reversed, the drive unit is controlled based on the stored information such that it automatically performs a completely reverse sequence of movements as compared to the action to be reversed.

9. The method according to claim 8, wherein the duration of the activation of the drive unit or the speed stage activated for this drive unit is detected and stored as information.

10. The method according to claim 1, wherein when each of the first, second, and third actions is performed, an adjusting action, the adjusting travel, the time course of the adjusting travel, the adjusting speed and/or the time course of the adjusting speed of a linear drive serving as a drive unit is detected and stored as information, wherein, when each of the first, second, and third actions is reversed, the linear drive is controlled based on the stored information such that the at least one component performs a reverse sequence of movements as compared to the action to be automatically completely reversed.

11. The method according to claim 1, wherein when each of the first, second, and third actions is performed, the sequence or the time course of the sequence of a stepper motor serving as a drive unit is detected and stored as information, wherein, when each of the first, second, and third actions is automatically completely reversed, the stepper motor is controlled based on the stored information with a reverse sequence of steps or with an opposite direction of rotation.

12. The method according to claim 1, wherein the at least one drive unit is controlled by a control unit dependent on the operating inputs provided by actuating the control elements.

13. The method according to claim 12, wherein the control unit stores parameters of the performed action or of the performed actions.

14. The method according to claim 1, wherein several actions are performed when the first control element is actuated and that said several actions are automatically completely reversed in reverse order when the second control element is actuated.

15. The method according to claim 1, wherein
the first control element is actuated, and as a result the first action is performed, and
the third control element is actuated after the first control element is actuated, and as a result the third action is performed after the first action.

16. The method according to claim 15, wherein the first control element is actuated, and as a result the first action is performed,
the third control element is actuated while the first action is performed, and as a result at least a part of the third action is performed during the first action, and
when the second control element is actuated, the first and the third action are reversed at least in part simultaneously.

17. A device for operating an operating table, comprising:
a plurality of components which are adjustable by control elements, wherein
a first control element, upon the actuation of which a first action of at least a first drive unit for adjusting at least a first component is performed,
a second control element, upon the actuation of which the first action performed by actuating the first control element is automatically completely reversed,
wherein when actuating a third control element, a third action of a second drive unit that adjusts the first component or a second component is performed,
that by actuating the second control element, the first action and the third action are automatically completely reversed,
the first control element is actuated, and as a result the first action is performed,
the third control element is actuated while the first action is performed, and as a result at least a portion of the third action is performed during the first action, and
when the second control element is actuated, the first and the third action are reversed at least in part simultaneously.

18. The method according to claim 17, wherein by actuating a fourth control element at least one of the first action, second action, and third action that had automatically completely been reversed before is repeatedly performed.

19. A device for operating an operating table, comprising:
a plurality of components which are adjustable by control elements, wherein
a first control element, upon the actuation of which a first action of at least a first drive unit for adjusting at least a first component is performed,
a second control element, upon the actuation of which the first action performed by actuating the first control element is automatically completely reversed, and
wherein when each of the first, second, and third actions is performed, the sequence or the time course of the sequence of a motor serving as a drive unit is detected and stored as information, wherein, when each of the first, second, and third actions is automatically completely reversed, the motor is controlled based on the stored information with a reverse sequence of steps or with an opposite direction of rotation.

20. The device according to claim 19, wherein the motor is one of a stepper motor and a linear drive.

* * * * *